United States Patent Office 2,792,204
Patented May 14, 1957

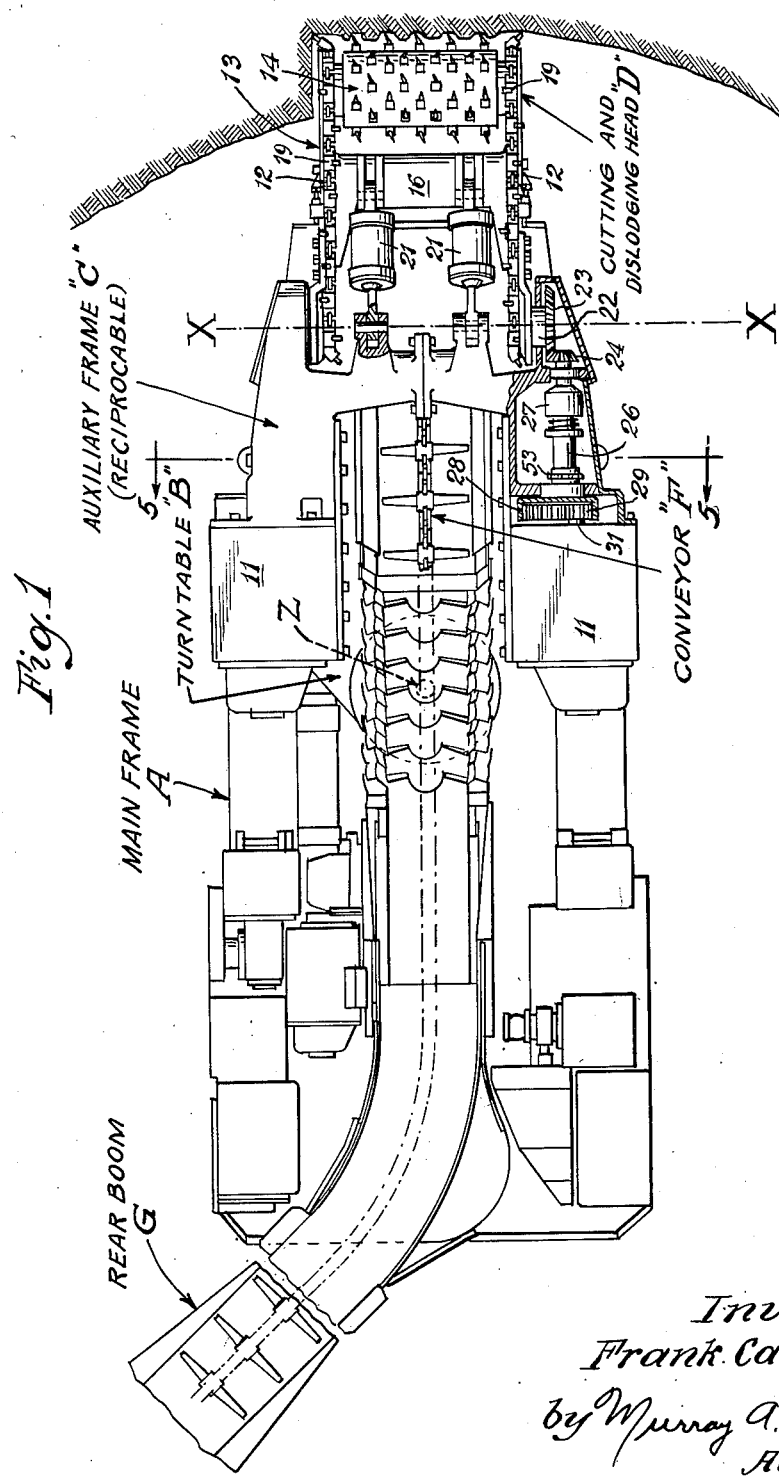

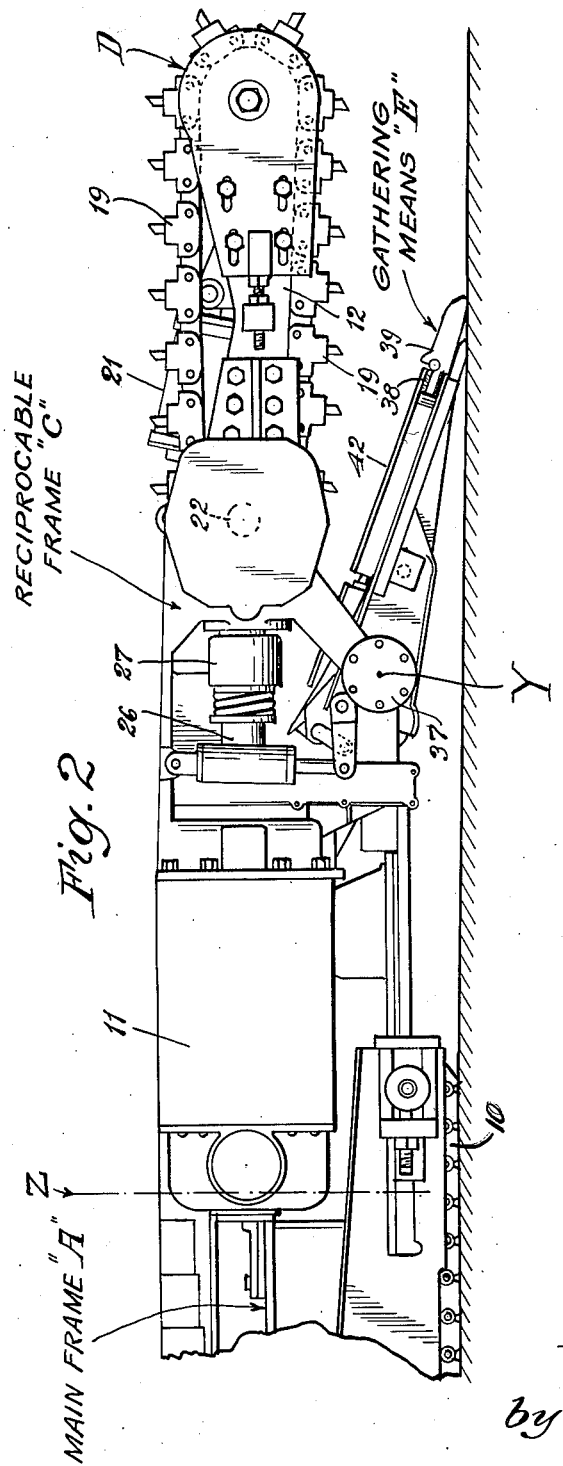

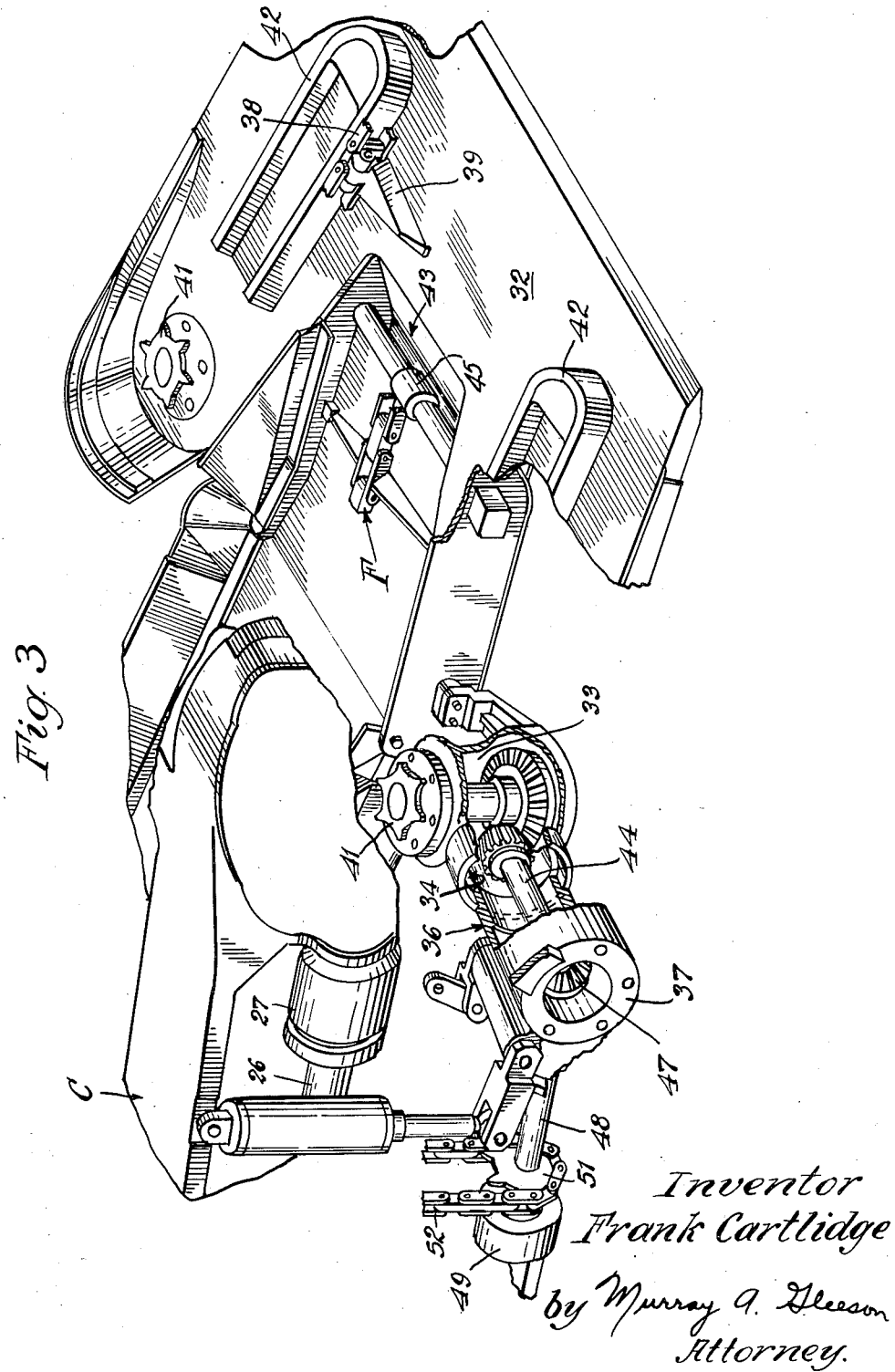

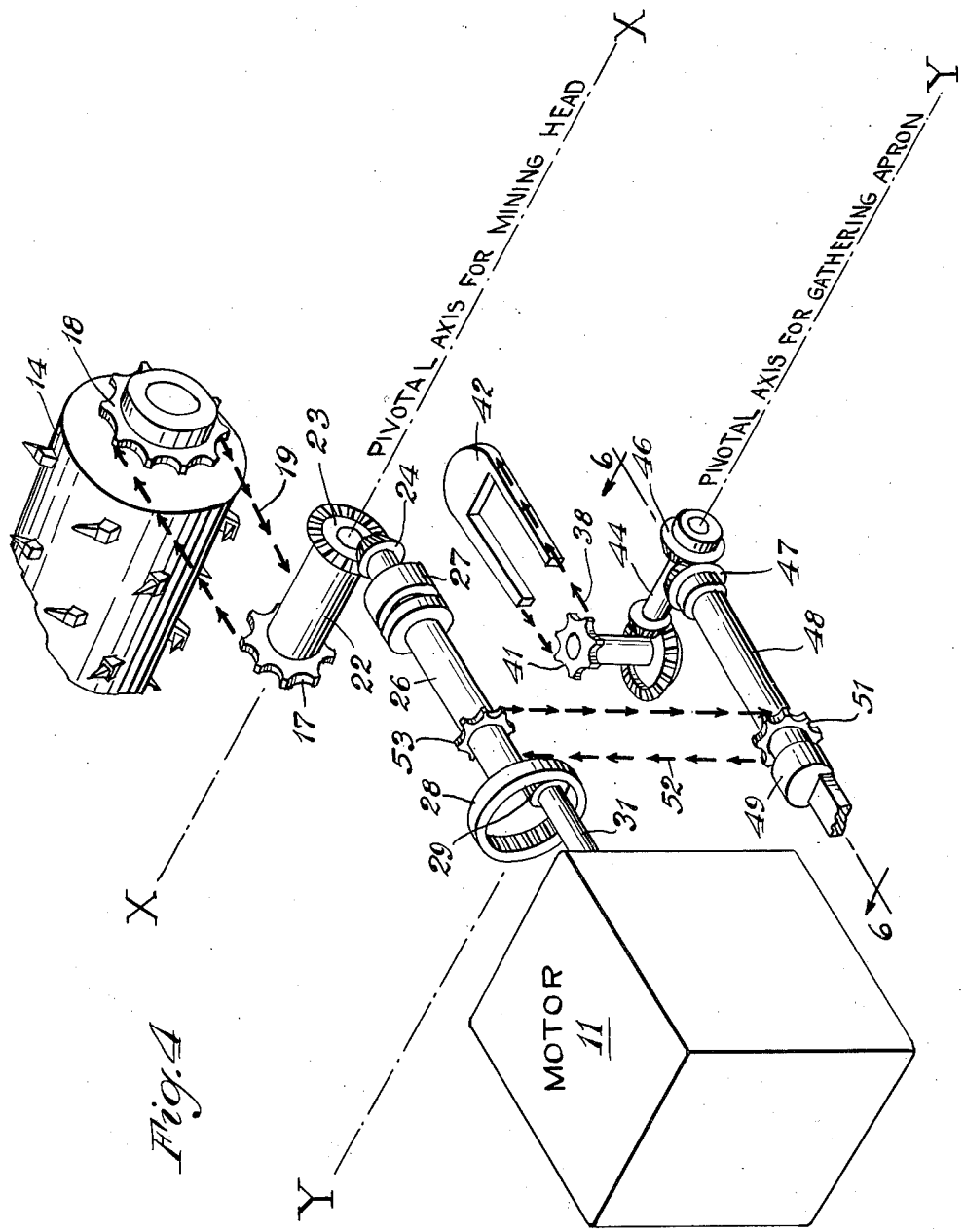

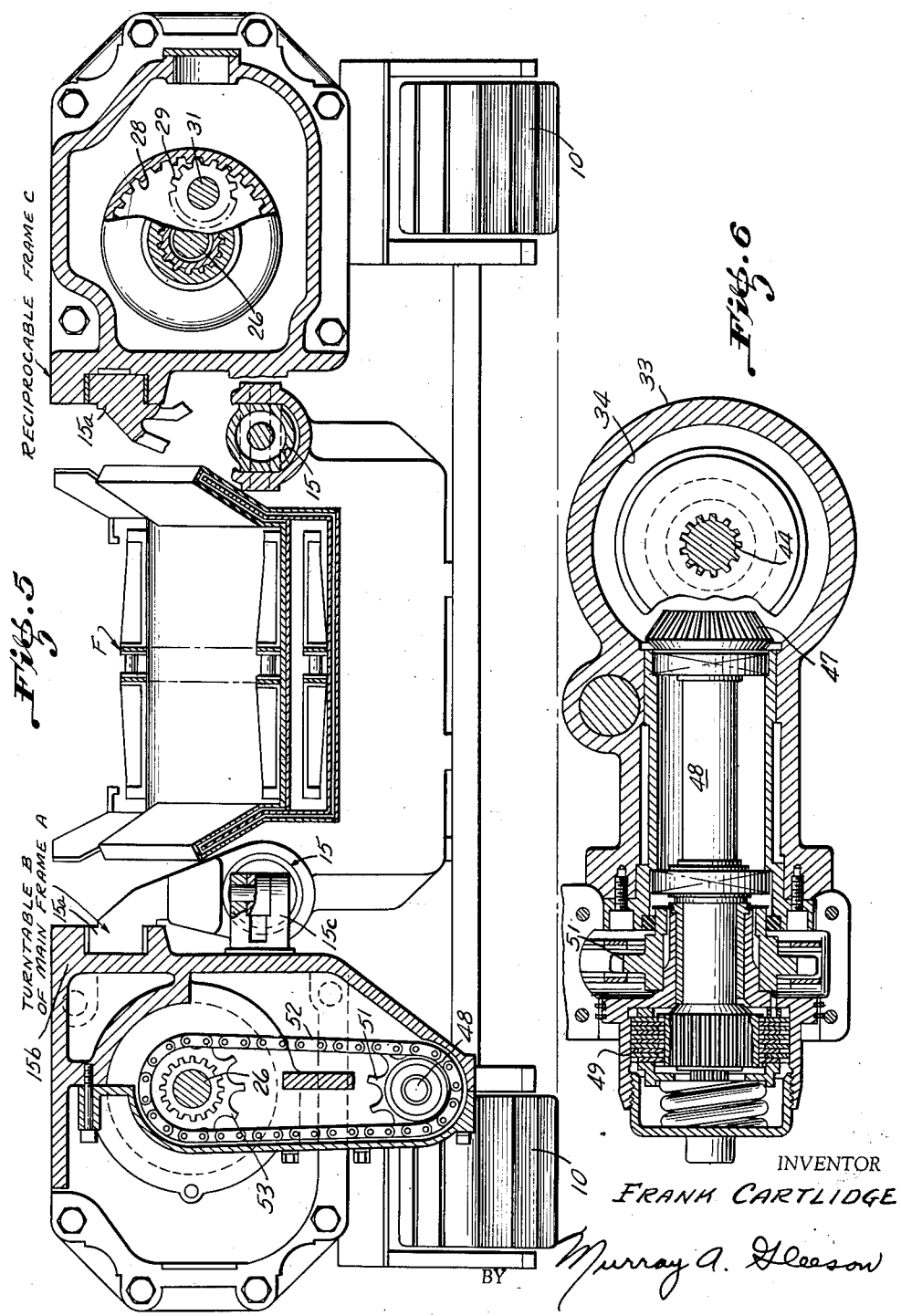

2,792,204

MINING APPARATUS WITH ROTARY CUTTING AND DISLODGING DRUM

Frank Cartlidge, Chicago, Ill., assignor to Goodman Manufacturing Company, Chicago, Ill., a corporation of Illinois Continuation of application Serial No. 221,057, April 14, 1951. This application October 25, 1954, Serial No. 464,372

4 Claims. (Cl. 262—9)

This invention relates generally to mining and particularly to an improved cutting and loading machine for mines.

This application is a continuation of my application Ser. No. 221,057, filed April 14, 1951, for Mining Apparatus, now abandoned.

This invention relates especially to the type of cutting and loading machine as disclosed in Cartlidge Patent No. 2,730,344, issued January 10, 1956, for Coal Mining Machines with Rotary Cutting and Dislodging Drum in which a mobile frame supports a cutting and dislodging head and a floor level gathering mechanism, both the head and gathering mechanism being tiltable up and down about separate transverse axes, and both being driven by the same set of motors carried on the frame.

The gathering mechanism employed in the above type of machine comprises a tiltable apron on which is mounted a pair of movable gathering elements which are effective to rake mined material onto a conveyor which extends forwardly to the gathering mechanism. One of the problems of constructing such a gathering mechanism is that of driving the two gathering elements by an arrangement which will not interfere with the transfer of material from them to the conveyor. In the past, this has been accomplished by driving them individually through gear trains extending alongside the gathering mechanism. Another problem has been that of providing a drive which is effective in all up and down tilted positions of the gathering apron and this has been accomplished by means of universal or flexible couplings. Such couplings have certain disadvantages which make it desirable to avoid them where possible.

Accordingly, a specific object of the present invention is a novel gear and shaft arrangement which avoids use of such universal couplings, yet provides clearance for material picked up by the gathering element to pass onto the conveyor, and at the same time permits the gathering apron to be pivotally adjusted to follow variations in the floor level.

Briefly, in the present invention, the gathering apron is pivoted on the main frame about a transverse axis for up and down tilting movement and the drive includes a pair of stub shafts located on each side of the gathering apron and which are rotatable about the transverse axis for driving the gathering elements.

Another object is the provision, in a cutting and loading machine, of an arrangement for driving both the head and the gathering mechanism from the same set of motors through pairs of transversely spaced stub shafts which are rotatable respectively about the tilting axes of the head and gathering mechanism, thereby avoiding entirely the use of universal flexible couplings and at the same time providing clearance in the middle of the machine for the conveyor and for mechanism for tilting the cutting and dislodging head.

Other objects and advantages will be seen in the following description taken in connection with the drawings in which:

Figure 1 is a plan view of a mining and loading machine incorporating one form of the present invention;

Fig. 2 is a fragmentary side view of Fig. 1;

Fig. 3 is a fragmentary perspective view of the gathering mechanism on the above machine;

Fig. 4 is a diagrammatic perspective view of the improved arrangement for simultaneously driving the mining head and the gathering mechanism from the same motor source;

Fig. 5 is a vertical transverse sectional view taken substantially along the line 5—5 of Fig. 1 looking in the direction of the arrows, showing details of driving mechanism for the mining head and gathering mechanism, and the arrangement whereby the reciprocable auxiliary frame is mounted for movement; and Fig. 6 is a detailed sectional view, certain parts being shown in elevation, showing the stub driving shaft for the gathering mechanism.

Referring now more specifically to the drawings and particularly to Figs. 1 and 2, the construction is identical to that shown in the patent of Lindgren et al., Patent No. 2,695,700, issued November 30, 1954, for Mining Conveyor, in which the present invention was shown but not claimed. The present disclosure, therefore, relates only to the details of the invention claimed in this application and for a description of other details of the machine the above application should be referred to.

The machine includes a main frame A having a turntable B on which is slidably mounted an auxiliary, reciprocable frame C carrying a cutting and dislodging head D which is pivotable up and down about an axis X. As seen in Fig. 2, the main frame A is arranged to move upon crawler treads 10.

The reciprocable frame C also carries gathering means E which is pivotable up and down about a transverse axis Y. An endless, chain-type conveyor F extends from the front of the machine, over the rear boom G, and is driven by any suitable means (not shown).

The turntable B is pivoted by suitable operating means (not shown) about a vertical axis Z.

The auxiliary frame C carries a pair of main motors 11—11 for simultaneously driving the head D and gathering mechanism E. Suitable piston and cylinder means 15, seen more particularly in Fig. 5, is provided for moving the reciprocable frame C, together with the motors 11, mining head D, gathering means E and associated parts, forward and backward on the swingable turntable B, all as disclosed in the above-mentioned patents, No. 2,695,700 and No. 2,730,344. As seen in Fig. 5, the cylinder of the piston and cylinder means 15 is formed with integral rails 15a upon which slides 15b are arranged to move upon movement of the pistons of the piston and cylinder means 15 which are connected to ears 15c carried by the reciprocable frame B.

Referring now to the constructional details of the cutting and dislodging head D, it comprises a pair of cutter bars 12—12 each of which is trunnioned on a bearing carried by the reciprocable frame C, for up and down tilting movement about the axis X. Thus, the pair of cutter bars 12—12 comprise, in effect, a tiltable boom which, for convenience, may be designated generally by the numeral 13. At the forward ends of the cutter bars, a cutter supporting drum 14 is journaled for rotation about suitable bearings. A tie-bar or crosspiece 16 holds the two cutter bars rigidly together. Each cutter bar 12 supports a gear sprocket 17 and a forward sprocket 18 (see Fig. 4) and an orbitally movable cutter chain 19 drivably connects the two sprockets. Thus, it will be seen that the cutter chains 19 serve the dual purpose of cutting outer kerfs as well as driving the forward sprockets 18 which in turn drive the intermediate drum 14.

For compactness, the space between the cutter bars 12 is utilized for cylinders 21—21 which lift and lower the head D about its axis X. And to provide proper clearance for the cylinders, the sprockets 17 are driven by stub shafts 22 instead of a single through-shaft.

As shown in Figs. 1 and 4, the stub shafts 22 are axially aligned for rotation about the pivotal axis X and each is suitably journaled within the auxiliary frame C. Each shaft is provided with an externally facing beveled gear 23 meshed with a beveled pinion 24 which is driven by shaft 26 through an overload clutch 27. Each of the shafts 26 carries an internally-toothed ring gear 28 meshed with a pinion 29 driven by one of the motor shafts 31.

From the foregoing it will be seen that the cutter chains 19 and drum 14 are simultaneously driven by the motors 11. By placing the shaft 22 for rotation about the pivotal axis of the mining head, it is unnecessary to employ any form of universal or flexible coupling to obtain up and down tilting movement of the head. And, furthermore, by employing individual stub shafts in the manner shown, enough room is gained between the cutter bars to provide space for compactly positioning the operating cylinders 21.

Referring now especially to the gathering mechanisms, see Figs. 3, 4, and 6, it comprises a supporting apron 32 having mounted on each side thereof a gear housing 33. Each housing is provided with an outwardly facing bore 34 embracing internally extending trunnions 36 formed on side portions 37 of the reciprocable frame C. On each side of the apron is an operable gathering element, in this case an orbitally movable gathering chain 38, having arms 39 and trained about a drive sprocket 41 at its rear end and about a U-shaped slide 42 at its forward end.

The apron is formed with a recess, centrally located, and generally designated 43, within which the forward end of the conveyor chain F is trained about an idler 45. The gathering arms 39 are effective to transfer material dislodged from the mine face across the apron and onto the conveyor F for ultimate discharge from the rear boom G.

In order to keep the gathering apron as close to the floor as possible to thereby maintain an easy angle of climb for the material passing onto the conveyor, a through-shaft which would raise the height of the rear end of the apron has been avoided in favor of a pair of individual stub shafts 44 which are axially aligned with one another on opposite sides of the conveyor and are rotatable about the pivotal axis Y of the gathering mechanism.

Continuing now the description of the drive for the gathering elements, with particular reference to Figs. 3, 4, and 6, it will be seen that the stub shafts 44 are provided with beveled gears 46 each of which is meshed with a beveled gear 47 on a longitudinal shaft 48, each shaft 48 being driven through an overload clutch 49 (by an arrangement not specifically shown) through a sprocket 51 which is connected by drive chain 52 to a corresponding upper sprocket 53 mounted on shaft 26. It will be understood that this combined driving arrangement shown in Fig. 4 is duplicated on both the right and left side of the machine.

By the arrangement just described the gathering mechanism is tiltable up and down about its pivotal axis to follow variations in the floor level without the use of the conventional universal flexible coupling and without the use of a through-shaft which, if beneath the gathering apron would lift it to an undesirable height above the floor or, if above the apron, would interfere with the transfer of mined material from the gathering arms to the conveyor.

The overall arrangement is a simplified and very effective and practical way of simultaneously driving the mining head D and the gathering mechanism E from the single pair of motors 11—11 mounted on the frame. It will be apparent that, if desired, the motors 11 may be substituted by a single motor.

While one form in which the present invention may be embodied has been shown and described, it will be understood that various modifications and variations thereof may be effective without departing from the spirit and scope of the invention as defined by the appended claims.

I claim as my invention:

1. In a mining and loading machine, an arrangement for simultaneously driving a cutting and dislodging head and a gathering mechanism comprising: a portable frame; a pair of horizontally spaced cutter bars mounted for up and down tilting movement about a first pivotal axis on said frame; a cutter chain orbitally movable about each cutter bar; a cutter bearing drum supported between the ends of said cutter bars and rotatably driven by said chains; means disposed between said cutter bars and having a connection to said portable frame for tilting said cutter bars about said first pivotal axis; a supporting apron for said gathering mechanism being mounted below said drum for up and down tilting movement about a second pivotal axis on said frame; said gathering mechanism including a pair of gathering elements operably mounted thereon; a pair of motors carried by said frame; a driving connection between each of said motors and a corresponding one of said cutter chains including an individual stub shaft rotatably driven about said first pivotal axis; and a driving connection between each of said motors and a corresponding one of said gathering elements including an individual stub shaft rotatably driven about said second pivotal axis.

2. In a mining and loading machine, an arrangement for simultaneously driving a cutting and dislodging head and a gathering mechanism comprising: a portable frame; a pair of horizontally spaced cutter bars mounted for up and down tilting movement about a first pivotal axis on said frame; a cutter chain orbitally movable about each cutter bar; a cutter bearing drum supported between the ends of said cutter bars and rotatably driven by said chains; hydraulic means disposed between said cutter bars for tilting said cutter bars about said first pivotal axis; a supporting apron for said gathering mechanism being mounted below said drum for up and down tilting movement about a second pivotal axis on said frame; said gathering mechanism including a pair of gathering elements operably mounted thereon; a pair of motors carried by said frame; a driving connection between each of said motors and a corresponding one of said cutter chains including an individual stub shaft rotatably driven about said first pivotal axis; and a driving connection between each of said motors and a corresponding one of said gathering elements including an individual stub shaft rotatably driven about said second pivotal axis.

3. In a mining and loading machine, an arrangement for simultaneously driving a cutting and dislodging head and a gathering mechanism comprising: a portable frame; a pair of horizontally spaced cutter bars mounted for up and down tilting movement about a first pivotal axis on said frame; a cutter chain orbitally movable about each cutter bar; a cutter bearing drum supported between the ends of said cutter bars and rotatably driven by said chains; means disposed between said cutter bars for tilting said cutter bars about said first pivotal axis; a supporting apron for said gathering mechanism being mounted below said drum for up and down tilting movement about a second pivotal axis on said frame; said gathering mechanism including a pair of gathering elements operably mounted thereon; a pair of motors carried by said frame; a driving connection between each of said motors and a corresponding one of said cutter chains including an individual stub shaft rotatably driven about said first pivotal axis; and a driving connection between each of said motors and a corresponding one of said gathering elements including an individual stub shaft rotatably driven about said second pivotal axis.

4. In a mining and loading machine, an arrangement for simultaneously driving a cutting and dislodging head and a gathering mechanism comprising: a portable frame; a pair of horizontally spaced cutter bars mounted for up and down tilting movement about a first pivotal axis on said frame; a cutter chain orbitally movable about each cutter bar; a cutter bearing drum supported between the ends of said cutter bars and rotatably driven by said chains; a supporting apron for said gathering mechanism being mounted below said drum for up and down tilting movement about a second pivotal axis on said frame; said gathering mechanism including a pair of gathering elements operably mounted thereon; a pair of motors carried by said frame; a driving connection between each of said motors and a corresponding one of said cutter chains including an individual stub shaft rotatably driven about said first pivotal axis; and a driving connection between each of said motors and a corresponding one of said gathering elements including an individual stub shaft rotatably driven about said second pivotal axis.

References Cited in the file of this patent

UNITED STATES PATENTS

| | | |
|---|---|---|
| 1,431,857 | Willcox | Oct. 10, 1922 |
| 1,866,789 | Barber | July 12, 1932 |
| 1,903,673 | Hauge | Apr. 11, 1933 |
| 2,269,781 | Osgood | Jan. 13, 1942 |
| 2,418,573 | Cartlidge | Apr. 8, 1947 |
| 2,630,902 | Bigelow | Mar. 10, 1953 |
| 2,691,513 | McElhattan | Oct. 12, 1954 |
| 2,695,700 | Lindgren et al. | Nov. 30, 1954 |
| 2,737,284 | Ball | Mar. 6, 1956 |

FOREIGN PATENTS

| | | |
|---|---|---|
| 144,316 | Australia | June 24, 1948 |